A. DOM.
TUBULAR PERFORATOR.
APPLICATION FILED JUNE 7, 1915.
1,279,495.
Patented Sept. 24, 1918.
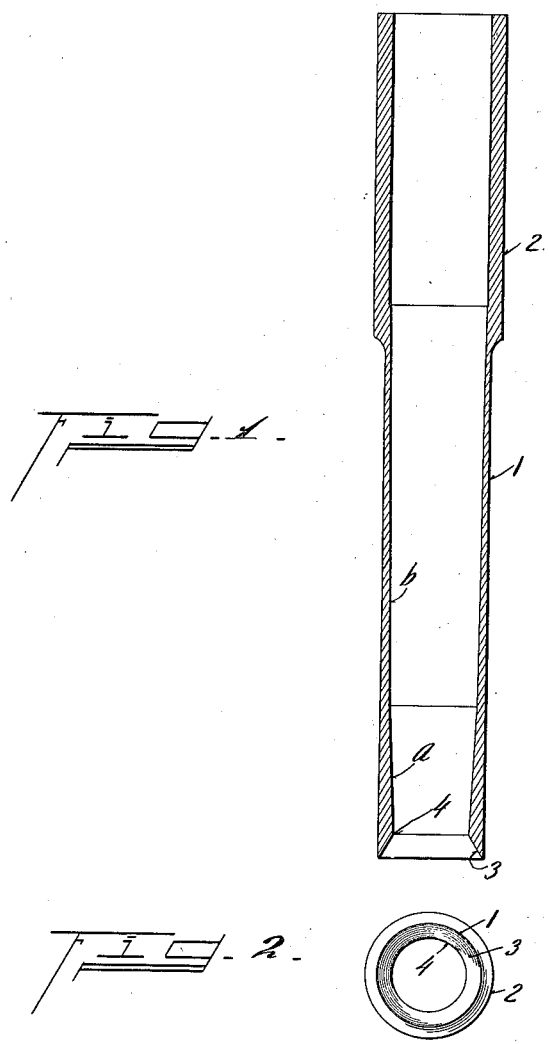
Inventor
Alexander Dom
By nnod + nerd.
Attorneys

UNITED STATES PATENT OFFICE.

ALEXANDER DOM, OF CINCINNATI, OHIO, ASSIGNOR TO THE SAMUEL C. TATUM COMPANY, OF CINCINNATI, OHIO, A CORPORATION OF OHIO.

TUBULAR PERFORATOR.

1,279,495.

Specification of Letters Patent. Patented Sept. 24, 1918.

Application filed June 7, 1915. Serial No. 32,526.

*To all whom it may concern:*

Be it known that I, ALEXANDER DOM, a citizen of the United States, and residing at Cincinnati, in the county of Hamilton and State of Ohio, have invented a new and useful Tubular Perforator, of which the following specification is a full disclosure.

This invention deals with a tubular paper perforator of the type disclosed in United States Patent No. 808,408, issued to Walter Sparks, Dec. 26, 1905, and it consists in improving the same by providing a compound relief in the base of the cutter for the purpose of reducing the friction of the discharging paper waste. The bore provides an inner delivery passage with a relief from one end to the other, and of different degrees at different portions of its length, and with a cutting edge beveled in a reverse direction. The portion of the bore immediately from the cutting edge is formed with a sharp angle or degree of taper for quickly reducing the friction of the waste comparative to the remaining portion of the bore which assumes a more gradual taper to a given length of shank without jeopardizing the intensity of the tool.

In the annexed drawing,

Figure 1 shows a longitudinal cross section of the improved drill punch or perforator of enlarged size.

Fig. 2 is a bottom plan view thereof.

The perforator consists of a tubular shank 1, preferably having an enlarged head 2, whereby it may be held in a rotating chuck. The shank and head are provided with a longitudinal bore as a delivery passage for the chips or waste and possessing a tapering relief from the mouth to the exit end, presenting the smaller diameter at the mouth for a free discharge of the chips. The mouth end has the bevel of the cutting edge 3, extending outwardly to the outer diameter of the shank in a reverse direction to the relief taper of the delivery passage. This bevel approximates sixty degrees.

The paper chips obviously are compressed, since the bore at the point 4 at its smallest diameter is appreciably smaller than the outside diameter of the tube, and will offer a certain resistance to passage therethrough owing to friction. A drill of 13/32" (.40625") outside diameter proportions a bore diameter at the mouth approximating .28925", a difference of .1170 between the inside and outside diameters.

This variation produces the proper cupping of the waste or chips as they are compressed through the mouth, and to prevent the friction unduly cumulating and the chips blocking the passage I provide a sudden relief by a comparative sharp degree of taper for a limited portion of the length of the bore immediate of the cutting edge bevel. This permits the chip to release quickly, accommodating for the degrees of expansion or spreading with the resulting pressure aiding to the continuous movement of the mass through the passage, and enable them to readily assume their set condition, after which they offer substantially no resistance to their discharge. From such sharp tapering region or quick relieving length, the bore continues toward the head with a more gradually tapering portion, and in the head 2 the bore is cylindrical and approximately of the outside diameter of the shank.

The portion or region $a$, defining the sharp tapering relief for the size of drill dimensioned above in length is about .5955", and a taper of about 5° while the gradually tapering portion $b$ has a taper equaling about 21 minutes for its length.

The drill may be used in any manner customary, as by a power or drill press, whereby it is rotated at a requisite speed, and depressed to feed it through the paper with accuracy and despatch. The compound bore relief materally reduces the frictional resistance of the discharging waste, permitting the tool to be fed at an increased speed without injury, over a tool of the art provided with a single continuous degree of taper, which distinguishing aspect, however, is inherently contained in my drill.

Having described my invention, I claim:—

1. A perforator having a tubular shank of uniform external diameter, and with a cutting edge formed on the extremity, the bore of the shank providing an inner delivery passage having relative different degrees of taper for different portions of its length, with the portion immediate the cutting edge dominating in degree.

2. A perforator having a tubular shank and a cutting edge formed on the extremity, and the bore of the shank tapering outwardly from the cutting end to the other in relative different degrees for different portions of its length, with the portion immediate the cutting edge dominating in degree, and with the bevel of the cutting edge in a reverse direction.

In witness whereof I hereunto subscribe my name, as attested by the two subscribing witnesses.

ALEXANDER DOM.

Witnesses:
 CLARENCE B. FOSTER,
 L. A. BECK.